(12) United States Patent
Elwakil

(10) Patent No.: US 7,278,730 B2
(45) Date of Patent: Oct. 9, 2007

(54) DECORATIVE LAMINATED SAFETY GLASS

(75) Inventor: Hamdy A. Elwakil, Hockessin, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 11/070,687

(22) Filed: Mar. 2, 2005

(65) Prior Publication Data

US 2005/0196560 A1 Sep. 8, 2005

Related U.S. Application Data

(60) Provisional application No. 60/549,607, filed on Mar. 2, 2004.

(51) Int. Cl.
*B41J 2/01* (2006.01)
(52) U.S. Cl. ............... 347/105; 347/101; 428/32.1
(58) Field of Classification Search ............... 347/100, 347/95, 96, 101, 105; 106/31.6, 31.27, 31.13; 523/160; 428/195, 32.1, 32.34
See application file for complete search history.

(56) References Cited

U.S. PATENT DOCUMENTS

| | | | |
|---|---|---|---|
| 4,173,672 A | 11/1979 | Mannheim | |
| 4,230,775 A * | 10/1980 | Derick et al. | 428/525 |
| 4,303,718 A * | 12/1981 | Snelgrove | 428/201 |
| 4,630,076 A | 12/1986 | Yoshimura | |
| 4,656,226 A | 4/1987 | Hutchins et al. | |
| 4,664,711 A * | 5/1987 | Kawaguchi et al. | 106/31.64 |
| 4,680,058 A * | 7/1987 | Shimizu et al. | 347/100 |
| 4,680,352 A | 7/1987 | Janowicz et al. | |
| 4,680,580 A | 7/1987 | Kawahara | |
| 4,722,984 A | 2/1988 | Janowicz | |
| 4,968,553 A | 11/1990 | Cesar | |
| 5,026,427 A | 6/1991 | Mitchell et al. | |
| 5,085,698 A | 2/1992 | Ma et al. | |
| 5,086,698 A | 2/1992 | Wirz | |
| 5,141,556 A | 8/1992 | Matrick | |
| 5,169,436 A | 12/1992 | Matrick | |
| 5,231,131 A | 7/1993 | Chu et al. | |
| 5,439,514 A | 8/1995 | Kashiwazaki et al. | |
| 5,519,085 A | 5/1996 | Ma et al. | |
| 5,698,016 A | 12/1997 | Adams et al. | |
| 5,914,178 A * | 6/1999 | Sol et al. | 428/195.1 |
| 6,037,405 A * | 3/2000 | Iwase et al. | 523/161 |
| 6,160,370 A | 12/2000 | Ohnuma | |
| 6,433,038 B1 | 8/2002 | Tanabe et al. | |
| 6,769,766 B2 | 8/2004 | Suzuki et al. | |
| 7,041,163 B2 | 5/2006 | Roman | |
| 2001/0003263 A1 | 6/2001 | Johnson et al. | |
| 2001/0004871 A1 | 6/2001 | Johnson et al. | |
| 2001/0020964 A1 | 9/2001 | Irihara et al. | |
| 2002/0056403 A1 | 5/2002 | Johnson et al. | |
| 2003/0052952 A1 | 3/2003 | Tanabe et al. | |
| 2003/0144375 A1 | 7/2003 | Wu et al. | |
| 2003/0224150 A1 * | 12/2003 | Ludwig et al. | 428/32.1 |
| 2004/0110868 A1 | 6/2004 | Zhu et al. | |
| 2004/0187732 A1 | 9/2004 | Roman et al. | |
| 2004/0234735 A1 | 11/2004 | Reynolds et al. | |
| 2004/0246319 A1 | 12/2004 | Ito et al. | |
| 2005/0048229 A1 | 3/2005 | Elwakil et al. | |
| 2005/0118401 A1 | 6/2005 | Smith et al. | |
| 2005/0196560 A1 | 9/2005 | Elwakil | |
| 2005/0215664 A1 | 9/2005 | Elwakil et al. | |
| 2005/0271865 A1 | 12/2005 | Elwakil et al. | |
| 2005/0282928 A1 | 12/2005 | Lin et al. | |
| 2005/0282946 A1 | 12/2005 | Lin et al. | |
| 2006/0099356 A1 | 5/2006 | Pray | |

FOREIGN PATENT DOCUMENTS

| | | |
|---|---|---|
| DE | 29706880(U1) | 5/1997 |
| DE | 20100717(U1) | 4/2001 |
| EP | 254 187 | 1/1988 |
| EP | 254 187 A2 | 1/1988 |
| EP | 254 187 A3 | 1/1988 |
| EP | 0 556 649 B1 | 6/1999 |
| EP | 1 129 844 A1 | 9/2001 |
| EP | 1 197 325 | 4/2002 |
| EP | 1 241 139 A1 | 9/2002 |
| EP | 1 321 497 A1 | 6/2003 |
| EP | 1 388 578 A1 | 2/2004 |
| WO | WO 00/49097 | 8/2000 |
| WO | WO 01/94476 A2 | 12/2001 |
| WO | WO 02/18154 A1 | 3/2002 |
| WO | WO 02/46322 A2 | 6/2002 |
| WO | WO 02/096654 A1 | 12/2002 |
| WO | WO 2004/011271 A1 | 2/2004 |
| WO | WO 2004/018197 A1 | 3/2004 |
| WO | WO 2004/053002 A1 | 6/2004 |

OTHER PUBLICATIONS

PCT International Search Report and Written Opinion for International application No. PCT/US2005/006653, dated May 30, 2005.
English Abstract of EP 254 187.
English Abstract of EP 1 197 325.
International Search Report and Written Opinion from PCT/US2005/041177 (counterpart to US 2006-0099356).

* cited by examiner

*Primary Examiner*—Manish S. Shah
(74) *Attorney, Agent, or Firm*—Kevin S. Dobson

(57) ABSTRACT

The present invention is a decorative laminated article including an image bearing thermoplastic interlayer wherein the image has been printed on the interlayer using an ink jet printing process, wherein the image includes a white pigment on the surface of the thermoplastic interlayer. The present invention is also a process for ink-jet printing white pigment ink on a thermoplastic polymer to obtain an image bearing laminate with good adhesive qualities.

38 Claims, No Drawings

DECORATIVE LAMINATED SAFETY GLASS

CROSS REFERENCE SECTION

This application claims the benefit of U.S. Provisional Application No. 60/549,607, filed Mar. 2, 2004.

BACKGROUND OF THE INVENTION

The present invention relates to decorative laminates bearing images printed on an interlayer by a process of ink jet printing. The present invention particularly relates to decorative laminates wherein the image has been printed onto an interlayer comprising polyvinyl butyral (PVB). The present invention also relates to ink formulations that are useful for preparing the laminates of the present invention.

Decorative laminates are known and obtained by various processes. DE 29706880, U.S. Pat. Nos. 4,968,553, 5,914, 178, EP 1129844A1, and DE 20100717 disclose making decorative glass laminates via a silk screening process. Silk-screening an image onto an interlayer is a very time-consuming and expensive process for making decorative laminated safety glass. A process for making decorative glass laminates has also been described in U.S. Pat. No. 4,173,672. This patent describes a transfer lamination process wherein an image printed on paper is transferred to a thermoplastic film, and the film bearing the transferred image is then laminated between glass sheets.

Use of "ink jet" technology to print on PVB and polyurethanes for laminated safety glass has been disclosed in WO0218154. Ink jet printing is known and is a conventional process for printing wherein ink droplets are propelled through a printing head at a high speed towards a printing substrate. Ink jet technology is very flexible because any digital image can be printed onto a substrate.

However, one disadvantage of printing directly on PVB using an ink jet printing process is that PVB interlayers have a roughened surface pattern (Rz from 30-60 µm) that can cause poor image quality in a printed image. The roughened surface pattern is necessary in a PVB lamination process to obtain laminates free of air bubbles and other defects caused by the presence of trapped air during the lamination process. However, when ink jet printing onto PVB, the rough surface pattern can affect image quality with respect to mottle and resolution.

Other problems with conventional processes for ink-jet printing are encountered due to the inks used in conventional ink-jet processes. Low viscosity inks are required in a conventional ink jet printing process to alleviate high pressure build-up in the print head of the ink jet printer, and subsequent damage to the head and/or poor quality in the printed image. Ink jet printing is carried out conventionally by either (a) drop on demand (DOD) processes, such as a piezo electric printing or thermal ink jet printing processes, or (b) continuous drop ink jet printing. There are other factors as well that make low viscosity inks necessary and preferable in ink jet printing processes. However, use of conventional inks that are suitable for ink jet printing can result in poor image quality on a thermoplastic interlayer. Poor image quality can be the result when a low viscosity ink is sprayed onto a roughened surface such as a PVB surface that has been prepared for lamination, due to ink running from high points to low spots on the interlayer surface.

Another potential problem with printing an image on an interlayer prior to lamination onto another substrate is that the adhesive bond between the interlayer and the substrate can be significantly weakened due to colorant on the surface of the interlayer that can reduce the "effective" bonding surface area between the substrate and the interlayer. "Effective bonding surface" as used herein describes the surface area where the interlayer and the substrate are in direct contact with each other without an intervening colorant layer. Reduction of the adhesive force of the laminate can result in the laminate having poor performance as a safety glass, or in the application for which it was intended.

Still further problems can be encountered with ink jet printing onto thermoplastic polymer interlayer when the printed image requires both white and clear (that is, areas where there is no ink jetted onto the substrate) portions. In order to obtain an area where white appears in a printed image, current practice requires printing colored ink onto a white thermoplastic sheet. The white that appears in the image obtained in this manner results from the additive in the sheet, and not from printing a white pigment onto those areas where white is desirable in the printed image. This is not a practical solution when a clear (transparent) area is desirable together in the same image with a portion of white.

Ink jet printing a white pigment is not a known process. More particularly, no white ink system suitable for ink jet printing onto an interlayer material is known. Various factors make white ink systems problematical for ink-jet printing, but one problem can be the particle size of the white pigment used in the ink dispersion can be too large for ink-jet printing.

It can be desirable in a process for printing on thermoplastic interlayers prior to lamination, to have a process for ink jet printing white ink onto thermoplastic interlayers so that areas of white can be observed in an image or text, in addition to clear or transparent areas where no ink has been printed onto the substrate.

It can be particularly desirable to have such a process and maintain laminate strength and resilience against breakage, while at the same time producing a quality image on the interlayer substrate.

SUMMARY OF THE INVENTION

In one aspect, the present invention is a process for ink-jet printing white pigment ink onto a thermoplastic polymer substrate material, wherein the white pigment ink is a non-aqueous dispersion comprising white pigment particles in a vehicle comprising at least one organic liquid and at least one dispersant for the white pigment.

In another aspect, the present invention is a non-aqueous white pigment ink dispersion suitable for ink-jet printing onto a thermoplastic polymer substrate material, wherein the white pigment ink is a non-aqueous dispersion comprising white pigment particles in a vehicle comprising at least one organic liquid and at least one dispersant for the white pigment.

In still another aspect, the present invention is a laminate article comprising an image-bearing interlayer substrate, wherein the image comprises white pigment particles that have been applied by printing, using an ink jet printing process, white ink dispersion onto at least one surface of the substrate.

In still another aspect, the present invention is a process for obtaining an image-bearing laminate having a laminate adhesive strength of at least about 1000 psi, the process comprising the steps: ink-jet printing a non-aqueous white pigmented ink onto at least one surface of a thermoplastic interlayer; and laminating the image-bearing interlayer between two transparent sheets of a suitable lamination substrate, wherein the white pigment ink is a non-aqueous dispersion comprising white pigment particles in a vehicle comprising at least one organic liquid and at least one dispersant for the white pigment.

Preferably the white pigment particles are titanium dioxide ($TiO_2$) particles. Preferably the $TiO_2$ particles have a size of less than about 500 nm. More preferably the $TiO_2$ particles have a size of from about 100 nm to about 400 nm. Even more preferably the $TiO_2$ particles have a size of from about 200 nm to about 300 nm.

DETAILED DESCRIPTION OF THE INVENTION

In one embodiment, the present invention is a method for printing an image onto a thermoplastic interlayer material by an ink jet printing process. A suitable thermoplastic interlayer material for the purposes of the present invention can be any conventionally known or commercially available thermoplastic material which is flexible enough yet rigid enough to be passed through an ink jet printer. Suitable thermoplastic materials useful as printing substrates in the practice of the present invention include polyurethane (PUR), polyesters such as polyethylene terephtalate (PET), polyvinyl chloride (PVC), and polyvinyl butyral (PVB), polyolefins such as polyethylene and/or polypropylene, for example. Preferred for the purposes of the present invention is polyvinylbutyral (PVB). PVB is available commercially from E.I. DuPont de Nemours & Co., under the tradename of Butacite®, for example.

Ink jet printing onto an interlayer material of the present invention is preferably conducted using pigmented ink. Pigmented inks are preferred because of their color-fastness, thermal stability, edge definition, and low diffusivity on the printed substrate. In conventional practice, the pigment is suspended in a liquid medium that is conventionally referred to as the "vehicle". Conventionally, a vehicle can comprise organic liquids (organic solvents) and/or water that alone or in combination are useful for dispersing the pigment. Pigments suitable for use in the practice of the present invention can be dispersed in a non-aqueous vehicle. A "non-aqueous" vehicle suitable for use herein is not strictly non-aqueous because as the term is used herein, a "non-aqueous" vehicle can include water in some minor proportion (no greater than 16 wt %) when particular organic solvents are used. Various conventional solvents are known and can be used alone or in combination with other suitable solvents. Useful but less preferred solvents include, for example, methyl isobutyl ketone (MIBK), methyl ethyl ketone (MEK), butyrolactone, and cyclohexanone. Preferred solvents include, for example, propylene glycol ethers, propylene glycol ether acetates such as dipropylene glycol monomethyl ether acetate for example, and ethylene glycol butyl ethers, or mixtures of any of these. In a particularly preferred embodiment, dipropylene glycol monomethyl ether acetate (DPMA) can be used to disperse the pigmented ink. Mixtures of DPMA at concentrations of up to about 50 wt % with glycol ethers and/or other organic solvents can also be preferred. More preferably, the concentration of DPMA in a solvent mixture can be from about 5 wt % to about 50 wt %, and most preferably from about 15 wt % to about 45 wt %.

Inks of the present invention have a viscosity that is sufficiently low that they can be jetted though a printing head of an ink jet printer without the necessity of heating the print head in order to lower the viscosity of the ink. In the practice of the present invention, the ink viscosity is below about 30 centipoises (cps), as measured at 25° C. Preferably the ink viscosity is below about 20 cps at 25° C. More preferably the ink viscosity is below about 15 cps, and most preferably below about 12 cps at 25° C.

Without being held to theory, the Applicants believe that problems with image quality using ink jet printing systems can result because ink systems used for jet printing have a much lower viscosity than, for example, inks used in a silk screen printing process. The low viscosity ink can "run" by gravity into the valleys of a roughened PVB surface. The inks, therefore, can form puddles in the low areas on the surface of the PVB, and will not adhere uniformly to the high spots. Therefore, while low viscosity ink is preferred, the viscosity should not be so low that the image quality is poor in the laminate, or that misting occurs during the printing process. Preferably the ink has a viscosity above about 1 cps. For DOD printing processes, the ink preferably has a viscosity above about 1.5 cps, more preferably above about 1.7, and most preferably above about 1.8 cps measured at 25° C. Viscosities of the inks are determined according to DuPont Standard Test Methods.

Preferable inks for use in the practice of the present invention are those that provide printed images having a satisfactory combination of image quality, light fastness, and weatherability. Further, laminates that incorporate image-bearing interlayers of the present invention should have the adhesion properties described herein. Due to the nature of the polymeric interlayer substrates used for printing according to the practice of the present invention, and the requirements for adhesion in a safety glass, choice of a suitable ink is not problem free. Inks that are suitable for use in the practice of the present invention should be compatible with the substrate to give satisfactory results.

Traditionally, pigments are stabilized to dispersion in a vehicle by dispersing agents, such as polymeric dispersants or surfactants. More recently, so-called "self-dispersible" or "self-dispersing" pigments (hereafter "SDPs") have been developed that are suitable for use in the practice of the present invention. SDPs are dispersible in an aqueous vehicle without the use of traditional dispersants. The pigment particles of this invention may be stabilized according to several methods. The pigment particles can be made self-dispersing by a surface treatment as described in, for example, WO01/94476, herein incorporated by reference for all purposes as if fully set forth, or the pigment particles can be stabilized by treatment with dispersant in the traditional way, or the pigments can be dispersed by some combination of surface treatment and traditional treatment.

Preferably, when a traditional dispersant is employed, the dispersant can be a random or structured polymeric dispersant. Preferred random polymers include acrylic polymer and styrene-acrylic polymers. Most preferred, however, are structured dispersants that include AB, BAB and ABC block copolymers, branched polymers and graft polymers. Some useful structured polymers are disclosed in U.S. Pat. No. 5,085,698, EP-A-0556649 and U.S. Pat. No. 5,231,131, which are incorporated herein by reference for all purposes as if fully set forth. Commercially available dispersants such as Dispersbyk® 2000 and Dispersbyk® 2001 can be used, for example.

An important parameter in the practice of the present invention is the Frequency of the roughened interlayer surface onto which is to be printed an image. The Frequency of the roughened surface can be calculated using data obtained from profilometer data. In the practice of the present invention, a suitable Frequency is above about 0.60 cycles/mm. It is preferable that the Frequency be in the range of from about 0.60 cycles/mm to about 3 cycles/mm. More preferably, the Frequency is in the range of from about 0.75 to about 2.9, and most preferably the Frequency is in the range of from about 0.85 to about 2.5 cycles/mm. Above the upper limit significant improvement in the image quality may not be observed. Below the lower limit, the image quality may be poor.

In another embodiment, the invention is a laminate comprising an image-bearing thermoplastic interlayer of the present invention. The interlayer can be laminated together with various transparent substrates such as, for example, glass or polycarbonate. Preferably, the image-bearing interlayer sheet is laminated between at least two sheets of glass. Other layers of interlayer can be positioned between the image-bearing interlayer and the glass, for example as in a glass/"conventional PVB"/"printed PVB"/glass laminate, wherein the printed PVB surface is in contact with the conventional PVB interlayer surface. The image-bearing interlayer can also be laminated directly to the glass. Conventional laminating techniques are useful and effective in obtaining laminates of the present invention.

In any event, a laminate of the present invention has adhesive strength that is comparable to conventional or non-decorative laminates. Adhesion in a laminate of the present invention, as measured by a compressive shear test is at least 1000 psi. Preferably the compressive shear strength is from about 1400 to about 2600 psi. More preferably, the adhesion of a laminate of the present invention is in the range of from about 1450 psi to about 2575 psi, and even more preferably from about 1740 to about 2540 psi. Most preferably the laminate has an adhesive strength of from about 1800 psi to about 2520 psi. Laminates of the present invention can be used in any application wherein conventional (that is, non-decorative) laminated glass is used. In addition to the conventional uses as safety glass, however, the laminates of the present invention can be used as decorative articles such as picture windows, decorative countertops, graphic art, image-bearing store-front windows, displays bearing company logos, advertising media, and/or any other use wherein a transparent laminate bearing an image can be desirable. In the practice of the present invention, and image can be defined as any visually discernible pattern which is can be digitized and ink-jet printed onto a substrate such as, for example, a drawing, a photograph, text, graphical design, patterns of colors, symbols, and/or similar examples.

Laminates of the present invention can be obtained from the image-bearing interlayer and known materials useful for producing safety glass or windows, such as glass or polycarbonate, for example. Lamination of the interlayer to the other components can be accomplished using conventional lamination techniques. For example, an image-bearing interlayer can be laminated to glass by pressing the interlayer between two sheets of glass at an elevated temperature and pressure, under conditions by which air bubbles can be removed or prevented from being trapped in the laminate article.

In another embodiment, the present invention is an image-bearing interlayer sheet that has been printed on according to the process described herein. A printed interlayer sheet of the present invention can be laminated with other suitable interlayer materials, such as PET, PUR and/or PVB, to obtain a stacked interlayer that can in turn be laminated with a suitable substrate of the present invention, such as glass or polycarbonate for example.

In another embodiment of this invention, a second interlayer sheet is placed between the primary image carrying layer and the laminate substrate, wherein the second layer can carry a printed image or be any solid, translucent color such as red, green, blue, or white, for example.

The white pigment ink of the present invention can be any dispersible white pigment that can be milled to a particle size sufficiently small to be ink jet printed using conventional ink jet printing devices. For example, titanium dioxide can be used if it is sufficiently milled and then dispersed in a vehicle that provides a stable white pigment ink for ink jet printing. In a preferred embodiment of the present invention, dry titanium dioxide powder can be dispersed directly into an ink vehicle without the addition of water to the ink system.

Preferably a suitable amount of white pigment is dispersed into the vehicle to provide sufficient pigment on a substrate surface when during the ink jet printing process. If the pigment level is too low, the depth of the coverage will not be sufficient to cover the substrate, and the substrate may show through the pigment on the substrate surface. If the pigment concentration is too high, the viscosity of the ink may be too high too use in an ink jet printing process. Preferably the pigment is dispersed in an amount of from about 1 part per hundred parts (pph) to about 40 pph. More preferably the pigment is dispersed in an amount of from about 5 pph to about 35 pph, even more preferably in an amount of from about 10 pph to about 30 pph.

Ink-jet printed images using the inks of the present invention can be obtained using conventional ink-jet printing equipment, most notably the print head. Print heads suitable for use in the practice of the present invention include print heads designed for piezo electric printing, thermal ink jet printing, and continuous drop printing, for example. Printing heads useful for piezo electric printing processes are available from, for example, Epson, Seiko-Epson, Spectra, XAAR and XAAR-Hitachi, and can be suitable for use in the practice of the present invention. Printing heads useful for thermal ink jet printing are available from, for example, Hewlitt-Packard and Canon and can be suitable for use in the practice of the present invention. Printing heads suitable for continuous drop printing are available from Iris and Video Jet, for example and can be suitable for use in the practice of the present invention.

EXAMPLES

The following examples are presented to illustrate the invention. The examples are not intended to limit the scope of the invention in any manner.

Test Methods

Viscosity was measured on a Brookfield DV-II+ viscometer. Samples were run using a small sample adapter (a jacketed vessel that holds the sample) and a 00 spindle. A water bath is used to re-circulate water through the jacket of the small sample adapter at 25° C. Each sample was run at 60 rpm and held for at least 5 minutes to allow the sample to equilibrate at 25° C. and give the rotation of the spindle enough time to drive out any air bubbles that may have been present in the sample. The sample size used for the analysis was approximately 18 mL.

Surface Roughness, Rz, is determined from the 10-point average roughness as described in ISO-R468 and is expressed in microns. Surface roughness is measured using a Mahr Federal (Providence, R.I.) surfanalyzer. Surface Pattern Frequency is calculated from the surfanalyzer data by making a graph of the autocorrelation function vs. distance of the profilometer data. The autocorrelation data are analyzed by fast Fourier transforms. The reported frequency of the surface pattern is the median frequency.

Compressive Shear Adhesion Test: Laminate adhesion (given in terms of compressive shear strength) is determined by the compressive shear test. The compressive shear strength is determined by sawing a laminate into six 2.54 cm×2.54 cm chips. The chips are held in a jig at 45° and a compression testing instrument is used to place force on the chip at the rate of 0.25 cm/min. The amount of force to cause cohesive failure of the glass-PVB bond is the compressive shear strength of the laminate.

General Ink Preparation Method

A 100-gram sample of the ink is prepared as follows:

To a 250-ml bottle charge the solvent(s) and the dispersant(s), and mix the components until the dispersants dissolve completely in the solvent(s). White pigment is added slowly to the container and mixed well. To the mixture is added zirconium media (0.8-1.0 mil). The container is then placed on a roller mill and the speed of the mill is adjusted to 200 rpm. The ink is milled for a specified time. The ink is separated from the media by filtration using 1-micron filter paper. The ink is then analyzed for physical properties. The solvents (ink vehicles) are abbreviated below as follows: dipropylene glycol methyl ether (DPM); dipropylene glycol methyl ether acetate (DPMA); tripropylene glycol propyl ether (TPnP); dipropylene glycol propyl ether (DPnP); tripropylene glycol methyl ether (TPM).

Examples 1 to 5

The inks were prepared according to the General Procedure, using the components in Table 1 in the amounts shown. The mixture in each example was milled for 12 hours. Examples 1, and 3-5 showed good filterability, and Example 2 had poor filterability. The inks had moderate to good stability, and each was excellent when tested for jetability, that is, excellent ability to be ink-jetted out of a printing head.

Examples 6-13

The inks were prepared according to the General Procedure, using the components in Table 1 in the amounts shown. The mixture in each example was milled for 24 hours. Examples 6, and 8-13 showed good filterability, and Example 7 had poor filterability. The inks had moderate to good stability, and each had excellent jetability.

TABLE 1

| Example | Pigment (pph) | Ink Vehicle (pph) | Dispersant (pph) | Viscosity (CPS) |
|---|---|---|---|---|
| 1 | R700 (25) | DPM (65) | D2001 (10) | 7.05 |
| 2 | R700 (25) | DPM (65) | D2000 (10) | 7.88 |
| 3 | R700 (25) | PPE (16.25)/DPM (48.75) | D 2001 (10) | 10.30 |
| 4 | TS-6200 | DPM (65) | D 2001 (10) | 6.83 |
| 5 | TS-6200 | DPM (65) | D 2001 (10) | 7.00 |
| 6 | R700 (25) | DPM (73) | D 2001 (2) | 4.88 |
| 7 | R700 (25) | DPMA (73) | D 2001 (2) | 4.53 |
| 8 | R700 (25) | TPnP (73) | D 2001 (2) | 9.20 |
| 9 | R700 (25) | DPnP (73) | D 2001 (2) | 5.53 |
| 10 | R700 (25) | DPnP (54.8)/DPMA (18.3) | D 2001 (2) | 4.52 |
| 11 | R700 (25) | DPM (58.5)/TPM (6.5) | D 2001 (10) | 7.35 |
| 12 | R700 (25) | DPM (58.5)/PPH (6.5) | D 2001 (10) | 8.22 |
| 13 | R700 (25) | DPM (65) | D 2001 (10) | 6.84 |

R700 is $TiO_2$ with and an alumina treatment, with 0.3% trimethylol propane (TMP), commercially available.

TS-6200 is $TiO_2$ with and an alumina treatment and a silica wet treatment, citric acid and TMP, commercially available.

D 2000 is Dispersbyk 2000.

D 2001 is Dispersbyk 2001.

TABLE 2

| Example | Pigment (pph) | Ink Vehicle (pph) | Dispersant (pph) | Viscosity (CPS) | Particle Size (nm) | Ink Stability |
|---|---|---|---|---|---|---|
| 14 | R700 (20) P-25 (5) | DPM (72.8) DPMA (0.0) | D2001 (2.2) | 6.7 | 289.4 | Good |
| 15 | R700 (20) P-25 (5) | DPM (63.5) DPMA (9.1) | D2001 (2.2) | 5.5 | 276.0 | Good |
| 16 | R700 (20) P-25 (5) | DPM (54.6) DPMA (18.2) | D2001 (2.2) | 5 | 256.2 | Good |
| 17 | R700 (20) P-25 (5) | DPM (45.5) DPMA (27.3) | D2001 (2.2) | 4.8 | 249.8 | Good |
| 18 | R700 (20) P-25 (5) | DPM (36.4) DPMA (36.4) | D2001 (2.2) | 4.8 | 257.7 | Good |
| 19 | R700 (20) P-25 (5) | DPM (18.2) DPMA (54.6) | D2001 (2.2) | EEE* | 336.0 | Poor |
| 20 | R700 (20) P-25 (5) | DPM (9.1) DPMA (63.5) | D2001 (2.2) | EEE* | 343 | Poor |

TABLE 2-continued

| Example | Pigment (pph) | Ink Vehicle (pph) | Dispersant (pph) | Viscosity (CPS) | Particle Size (nm) | Ink Stability |
|---|---|---|---|---|---|---|
| 21 | R700 (20) P-25 (5) | DPM (0) DPMA (72.8) | D2001 (2.2) | EEE* | 494.8 | Poor |

P-25 TiO$_2$ is nano TiO$_2$ available from Degussa.
*Viscosity was too high (>10 cps) to be determined under the test conditions used.
Example 14 is 0% DPMA and 100% DPM (solvent ratios)
Example 21 is 100% DPMA and 0% DPM.

The ink of Example 16 was printed on PVB using a JV3 printer. The white ink was printed monochromatically and in combinations with other colors in two different modes.

Mode 1: The white ink was printed first then the color (CMYK) was printed on the top of it (overprinted)

Mode 2: The white ink was printed simultaneously printed with the other colors (CMYK).

Adhesion (psi) was measured and the results are summarized in Table 3.

TABLE 3

| Color | Monochrome | Mode 1 | Mode 2 |
|---|---|---|---|
| White (50% coverage) | 2920 | | |
| White (100% coverage) | 2511 | | |
| Cyan | 2285 | 2330 | 2031 |
| Magenta | 2375 | 2024 | 1881 |
| Yellow | 2247 | 2177 | 2039 |
| Black | 2589 | 2400 | 2249 |

TABLE 4

Viscosity Comparison of Different TiO$_2$ Particle Sizes

| Example | Pigment (pph) | Ink Vehicle (pph) | Dispersant (pph) | Original Viscosity (CPS) | Original Particle Size (nm) |
|---|---|---|---|---|---|
| 22 | R700 | DPM (54.6) DPMA (18.2) | D2001 (2.2) | 5.0 | 256.2 |
| 23 | R796 | DPM (54.6) DPMA (18.2) | D2001 (2.2) | 4.8 | 274.8 |
| 24 | TS 6200 | DPM (54.6) DPMA (18.2) | D2001 (2.2) | 5.0 | 305.3 |

In spite of the similarity in the original viscosity data for the different TiO$_2$ particles in Table 4, the R700 is preferred because of the smaller particle size.

Inks were prepared according to the General Procedure and the viscosity and particle size of the TiO$_2$ was measured. The inks were placed in oven for 14 days at 70° C. before the physical properties were measured for a second time. The results are shown in Table 5. The stability of the inks is good since DPMA is less than 50% of the solvent content of the inks.

TABLE 5

White Ink Stability

| Example | Pigment (pph) | Ink Vehicle (pph) | Dispersant (pph) | Original Viscosity (CPS) | Original Particle Size (nm) | Viscosity after oven aging | Partice Size after oven aging |
|---|---|---|---|---|---|---|---|
| 22 | R700 (35) | DPM (56.2) DPMA (6.2) | D2001 (2.6) | 5.71 | 160 | 4.9 | 219.8 |
| 23 | TS 6200 (35) | DPM (56.2) DPMA (6.2) | D2001 (2.6) | 5.76 | 207.7 | 5.71 | 254.1 |
| 24 | R706 (35) | DPM (56.2) DPMA (6.2) | D2001 (2.6) | 5.8 | 208.3 | 5.78 | 225.4 |
| 25 | R700 (35) | DPM (62.4) | D2001 (2.6) | 6.26 | 209.5 | 6.04 | 206.0 |
| 26 | R700 (35) | DPM (56.2) TPnP (6.2) | D2001 (2.6) | 6.7 | 220.1 | 5.72 | 210.1 |
| 27 | TS 6200 (35) | DPM (56.2) TPnP (6.2) | D2001 (2.6) | 6.6 | 228.4 | 6.39 | 227.7 |
| 28 | R706 (35) | DPM (56.2) TPnP (6.2) | D2001 (2.6) | 6.49 | 227.6 | 6.56 | 218.8 |
| 29 | R700 (35) | DPM (50.0) DPMA (6.2) TPnP (6.2) | D2001 (2.6) | 6.11 | 212.1 | 5.96 | 212.9 |

Examples 30 and 31 and Comparative Examples C1

The ink of Example 11 was printed onto a sheet of PVB at 100% coverage and also at 50% coverage, and the sheets laminated to glass. The comparative example had 0% coverage with the white ink. The adhesion was measured and is provided in Table 6.

Example 32 and 33 and Comparative Examples C2

The ink of Example 12 was printed onto a sheet of PVB at 100% coverage and also at 50% coverage, and the sheets laminated to glass. The comparative example had 0% coverage with the white ink. The adhesion was measured and is provided in Table 6.

Examples 34 and 35 and Comparative Examples C3

The ink of Example 13 was printed onto a sheet of PVB at 100% coverage and also at 50% coverage, and the sheets laminated to glass. The comparative example had 0% coverage with the white ink. The adhesion was measured and is provided in Table 6.

TABLE 6

| Example | Coverage (%) | Adhesion (psi) |
|---|---|---|
| 30 | 100 | 1440 |
| 31 | 50 | 2468 |
| C1 | 0 | 2355 |
| 32 | 100 | 1345 |
| 33 | 50 | 2340 |
| C2 | 0 | 2325 |
| 34 | 100 | 1491 |
| 35 | 50 | 2354 |
| C3 | 0 | 2397 |

What is claimed is:

1. A process for ink-jet printing ink onto a polyvinyl butyral sheet, comprising providing the polyvinyl butyral sheet and ink jet printing the ink onto at least one surface of the polyvinyl butyral sheet, wherein the ink is white pigment ink and the white pigment ink is a non-aqueous dispersion comprising white pigment particles in a vehicle comprising at least one organic liquid and at least one dispersant for the white pigment, wherein the polyvinyl butyral sheet comprises one surface which is a roughened surface and the ink jet printing the ink is onto the roughened surface of the polyvinyl butyral sheet, and wherein roughened surface of the polyvinyl butyral sheet has a roughened surface pattern with a Frequency in the range of from about 0.60 cycles/mm to about 3 cycles/mm.

2. The process of claim 1 wherein the white pigment particles are titanium dioxide ($TiO_2$) particles.

3. The process of claim 2 wherein the $TiO_2$ particles have a size of less than about 500 nm.

4. The process of claim 3 wherein the $TiO_2$ particles have a size of from about 100 nm to about 400 nm.

5. The process of claim 4 wherein the $TiO_2$ particles have a size of from about 200 nm to about 300 nm.

6. The process of claim 5 wherein the organic liquid is dipropylene glycol monomethyl ether acetate (DPMA) and the vehicle comprises the DPMA in a concentration of up to about 50 weight % of the total vehicle concentration.

7. The process of claim 6 wherein the DPMA comprises from about 5 to about 50 weight % of the vehicle.

8. The process of claim 4 wherein the white pigment ink has a viscosity of above about 1.7 to below about 15 centipoises measured at 25° C.

9. The process of claim 4 wherein the organic liquid is selected from the group consisting of propylene glycol ethers, propylene glycol ether acetates, ethylene glycol butyl ethers, and mixtures of any of these.

10. The process of claim 2 wherein the organic liquid is selected from the group consisting of propylene glycol ethers, propylene glycol ether acetates, ethylene glycol butyl ethers, and mixtures of any of these.

11. The process of claim 1 wherein the non-aqueous dispersion comprises from about 1 part per hundred parts (pph) to about 40 pph of the white pigment particles.

12. The process of claim 11 wherein the non-aqueous dispersion comprises from about 5 part per hundred parts (pph) to about 35 pph of the white pigment particles and the organic liquid is selected from the group consisting of propylene glycol ethers, propylene glycol ether acerates, ethylene glycol butyl ethers, and mixtures of any of these.

13. The process of claim 12 wherein the vehicle comprises from about 15 weight % to about 45 weight % DPMA as the organic liquid.

14. A laminate article comprising an image-bearing polyvinyl butyral sheet prepared by the process of claim 1, wherein the image comprises the white pigment particles that have been applied to the polyvinyl butyral sheet by the ink jet printing.

15. The laminate article of claim 14 wherein the image-bearing polyvinyl butyral sheet is laminated to two sheets of glass.

16. The laminate article of claim 14 wherein the image-bearing polyvinyl butyral sheet, a second polyvinyl butyral sheet that is not image bearing, and two sheets of glass are laminated to form a laminate having the following order: glass/image-bearing polyvinyl butyral sheet/second polyvinyl butyral sheet/glass; and wherein the image-bearing surface of the image-bearing polyvinyl butyral sheet is in contact with a surface of the second polyvinyl butyral sheet.

17. The laminate article of claim 14 wherein the image comprises a white area comprising the white pigment particles and a transparent area where there is no ink on the substrate.

18. An image-bearing polyvinyl butyral sheet prepared by the process of claim 1, wherein the image comprises the white pigment particles that have been applied to the polyvinyl butyral sheet by the ink jet printing.

19. The process of claim 1 wherein roughened surface of the polyvinyl butyral sheet has a roughened surface pattern with a Frequency in the range of from about 0.85 to about 2.5 cycles/mm.

20. The process of claim 1 wherein roughened surface of the polyvinyl butyral sheet has a roughened surface pattern with a Rz from 30-60 μm.

21. The process of claim 1 wherein the white pigment ink has a viscosity of above about 1 to below about 30 centipoises measured at 25° C.

22. The process of claim 1 wherein the organic liquid is selected from the group consisting of propylene glycol ethers, propylene glycol ether acetates, ethylene glycol butyl ethers, and mixtures of any of these.

23. The process of claim 1 wherein the organic liquid is selected from the group consisting of dipropylene glycol methyl ether; dipropylene glycol methyl ether acetate;

tripropylene glycol propyl ether; dipropylene glycol propyl ether; tripropylene glycol methyl ether.

24. The process of claim 1 wherein the process further comprises printing a color ink on the polyvinyl butyral sheet.

25. The process of claim 1 wherein the process further comprises printing a color (CMYK) ink on top of the white pigment ink.

26. The process of claim 1 wherein the process further comprises printing a color (CMYK) ink simultaneously with the white pigment ink.

27. A laminate article comprising an image-bearing polyvinyl butyral sheet laminated to two sheets of glass, (a) wherein the image-bearing polyvinyl butyral sheet is prepared by a process for ink-jet printing ink onto a polyvinyl butyral sheet comprising (i) providing a polyvinyl butyral sheet and (ii) ink jet printing ink onto at least one surface of the polyvinyl butyral sheet; (b) wherein the ink is white pigment ink and the white pigment ink is a non-aqueous dispersion comprising white pigment particles in a vehicle comprising at least one organic liquid and at least one dispersant for the white pigment; (c) wherein the image comprises the white pigment particles that have been applied to the polyvinyl butyral sheet by the ink jet printing; and (d) wherein laminate has adhesion as measured by a compressive shear test of from about 1400 to about 2600 psi.

28. The laminate article of claim 27 wherein the image further comprises color ink.

29. The laminate article of claim 27 wherein the image further comprises color (CMYK) ink on top of the white pigment ink.

30. The laminate article of claim 27 wherein the image further comprises color (CMYX) ink that was printed simultaneously with the white pigment ink.

31. A process for ink-jet printing ink onto a polyvinyl butyral sheet, comprising providing a polyvinyl butyral sheet having a roughened surface pattern with a Frequency above about 0.60 cycles/mm and ink jet printing the ink onto the roughened surface of the polyvinyl butyral sheet wherein the ink is white pigment ink having a viscosity of above about 1.7 to below about 15 centipoises (as measured at 25° C.) and the white pigment ink is a non-aqueous dispersion comprising from about 5 part per hundred parts (pph) to about 35 pph white pigment titanium dioxide particles within the range of from about 100 nm to about 400 nm in a vehicle comprising an organic liquid selected from the group consisting of propylene glycol ethers, propylene glycol ether acetates, ethylene glycol butyl ethers, and mixtures of any of these, and at least one dispersant for the white pigment.

32. The process of claim 31 wherein roughened surface of the polyvinyl butyral sheet has a roughened surface pattern with a Rz from 30-60 μm.

33. The process of claim 32 wherein the organic liquid is dipropylene glycol monomethyl ether acetate and the vehicle comprises the dipropylene glycol monomethyl ether acetate in a concentration of from about 5 to about 50 weight % of the vehicle.

34. A laminate article comprising an image-bearing polyvinyl butyral sheet prepared by the process of claim 31, wherein the image comprises the white pigment particles that have been applied by to the polyvinyl butyral sheet by the ink jet printing.

35. The laminate article of claim 34 wherein the image-bearing polyvinyl butyral sheet is laminated between two sheets of glass.

36. The process of claim 31 wherein the dispersant is a random polymers selected from acrylic polymers and styrene-acrylic polymers.

37. The process of claim 31 wherein the dispersant is a structured polymeric dispersant.

38. The process of claim 31 wherein the organic liquid is selected from the group consisting of dipropylene glycol methyl ether; dipropylene glycol methyl ether acetate; tripropylene glycol propyl ether; dipropylene glycol propyl ether; tripropylene glycol methyl ether.

* * * * *

UNITED STATES PATENT AND TRADEMARK OFFICE
CERTIFICATE OF CORRECTION

PATENT NO.       : 7,278,730 B2                                             Page 1 of 1
APPLICATION NO.  : 11/070687
DATED            : October 9, 2007
INVENTOR(S)      : Hamdy A. Elwakil It is certified that error appears in the above-identified patent and that said Letters Patent is hereby corrected as shown below:

Claim 30, column 13, line 32 - delete "(CMYX)" and add --(CMYK),-- so line reads:
-- further comprises color (CMYK) ink that was printed simul- --

Signed and Sealed this

Twenty-sixth Day of August, 2008

JON W. DUDAS
*Director of the United States Patent and Trademark Office*